US005740409A

United States Patent [19]
Deering

[11] Patent Number: 5,740,409
[45] Date of Patent: Apr. 14, 1998

[54] COMMAND PROCESSOR FOR A THREE-DIMENSIONAL GRAPHICS ACCELERATOR WHICH INCLUDES GEOMETRY DECOMPRESSION CAPABILITIES

[75] Inventor: Michael F. Deering, Los Altos, Calif.

[73] Assignee: Sun Microsystems, Inc., Palo Alto, Calif.

[21] Appl. No.: 673,494

[22] Filed: Jul. 1, 1996

[51] Int. Cl.[6] .................... G06F 15/16; G06F 15/00; G06K 9/74
[52] U.S. Cl. .................... 395/503; 395/522; 382/232
[58] Field of Search .................... 382/233, 232, 382/243, 242, 241; 364/715.02; 395/502, 503, 522

[56] References Cited

U.S. PATENT DOCUMENTS

| 5,208,872 | 5/1993 | Fisher | 382/42 |
|---|---|---|---|
| 5,276,898 | 1/1994 | Kiel et al. | 395/800 |
| 5,392,393 | 2/1995 | Deering | |
| 5,408,605 | 4/1995 | Deering | 395/522 |
| 5,440,682 | 8/1995 | Deering | |
| 5,517,611 | 5/1996 | Deering | |
| 5,585,944 | 12/1996 | Rodriguez | 358/500 |

OTHER PUBLICATIONS

Deering, et al., "FBRAM: A New Form of Memory Optimized for 3D Graphics," Computer Graphics Proceedings, Annual Conference Series, 1994, pp. 167–174.

Deering, Michael, "Geometry Compression," Computer Graphics Proceedings, Annual Conference Series, 1995, pp. 13–20.

Deering, et al., "Leo: A System for Cost Effective 3D Shaded Graphics," Computer Graphics Proceedings, Annual Conference Series, 1993, pp. 101–108.

Primary Examiner—Kee M. Tung
Assistant Examiner—Cao H. Nguyen
Attorney, Agent, or Firm—Conley, Rose & Tayon; Jeffrey C. Hood

[57] ABSTRACT

A 3-D graphics accelerator which includes a command block with geometry data decompression capabilities and thus includes improved performance over prior art designs. The 3-D graphics accelerator couples to a system bus in the computer system and receives compressed geometry data from the system memory. The 3-D graphics accelerator includes a command block or preprocessor, a plurality of floating point processors or blocks, and one or more draw processors or blocks. The command processor includes a first data path which transmits non-compressed geometry data, and a second data path which receives the compressed geometry data and decompresses the compressed geometry data. In the preferred embodiment, the command processor includes one or more input buffers, a geometry decompression unit, and multiplexer logic. The input buffers couple to the system bus for receiving geometry input data. The geometry input data includes compressed geometry input data and non-compressed geometry input data. The geometry decompression unit couples to an output of the input buffers and receives and decompresses the compressed geometry input data. The multiplexer receives the non-compressed output from the input buffers and receives the decompressed output from the geometry decompression unit. The multiplexer includes an output which selectively provides either the non-compressed geometry data or the decorepressed geometry input to other logic in the system.

23 Claims, 10 Drawing Sheets

Command Block Diagram

Draw Block Diagram

Bus Block Diagram

FD-Bus Block Diagram

CDC-Bus Block Diagram

5,740,409

COMMAND PROCESSOR FOR A THREE-DIMENSIONAL GRAPHICS ACCELERATOR WHICH INCLUDES GEOMETRY DECOMPRESSION CAPABILITIES

FIELD OF THE INVENTION

The present invention relates to a 3-D graphics accelerator, and more particularly to an improved command processor architecture for a 3-D graphics accelerator which includes a first data path for non-compressed geometry data and a second data path comprising a geometry decompression unit for receiving and decompressing compressed geometry data.

DESCRIPTION OF THE RELATED ART

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three dimensional geometry data that defines three dimensional graphics elements for display on a display device. The application program causes the host processor to transfer the geometry data to the graphics accelerator. The graphics accelerator receives the geometry data and renders the corresponding graphics elements on the display device.

The design architecture of a high performance three dimensional graphics system historically embodies a balance between increasing system performance and minimizing system cost. However, prior graphics systems usually suffer from either limited performance or high cost due to a variety of system constraints.

Applications which display three dimensional graphics require a tremendous amount of processing capabilities. For example, for a computer system to generate smooth 3-D motion video, the computer system is required to maintain a frame rate or update rate of between 20 to 30 frames per second. This requires a 3-D computer graphics accelerator capable of processing over a million triangles per second.

In general, 3-D computer graphics accelerators have had three major bottleneck points which limit performance. A first bottleneck is the requirement that geometric rendering primitives, e.g., lines and triangles, be transferred from the main system memory on the host computer to the graphics accelerator. The operation of the host processor memory system and system bus on which the data is transferred can limit the transfer rate of these geometric rendering primitives from the host memory to the 3-D accelerator. A second bottleneck is the vertex processing requirements, including transformation, lighting, set-up, etc. inside the accelerator. A third bottleneck is the speed at which pixels from primitives can be filled into the frame buffer.

In order to build a higher performance 3-D graphical architecture, the throughput of all the above three areas must increase. As mentioned above, one of the main bottlenecks in 3-D graphics architectures has traditionally been the speed at which pixels from primitives are filled into the frame buffer memory. Systems have traditionally used dual ported video RAM (VRAM) or interleaved DRAM in attempts to achieve higher throughput. A new type of video memory referred to as 3DRAM increases the pixel throughput rate by an order of magnitude. With use of 3DRAM in a graphics accelerator system, the 3-D rendering bottleneck no longer resides at the fill rate at which pixels from primitives are filled into the frame buffer. Rather, with the use of 3DRAM, the performance bottleneck typically comprises either the transfer rate of geometry data on the system bus or the 3-D graphics accelerator processing, including the vertex processing. Therefore, a new 3-D graphics accelerator architecture is desired which provides increased performance.

U.S. Pat. No. 5,408,605 to Deering, which is assigned to Sun Microsystems, discloses a command preprocessor for a 3-D graphics accelerator according to the prior art. As shown, this prior art 3-D graphics architecture includes a command preprocessor which couples to one or more floating point processors. Each of the floating point processors in turn couples to a plurality of draw processors.

In this system, the computer system memory is required to transmit a large amount of geometry data to the command processor in the 3-D graphics accelerator. As mentioned above, operation of the host processor memory system and system bus on which the data is transferred can limit the geometry data transfer rate from the host memory to the 3-D graphics accelerator. Therefore, an improved 3-D graphics accelerator is desired which includes improved geometry data transfer capabilities.

SUMMARY OF THE INVENTION

The present invention comprises a 3-D graphics accelerator for a computer system which includes improved performance over prior art designs. The 3-D graphics accelerator couples to a system bus in the computer system and receives compressed geometry data from the system memory. The 3-D graphics accelerator includes a command block or preprocessor, a plurality of floating point processors or blocks, and one or more draw processors or blocks. The command processor includes a first data path which transmits non-compressed geometry data, and a second data path which receives the compressed geometry data and decompresses the compressed geometry data.

In the preferred embodiment, the command processor includes one or more input buffers, a geometry decompression unit, and multiplexer logic. The input buffers couple to the system bus for receiving geometry input data. The geometry input data includes compressed geometry input data and non-compressed geometry input data. The geometry decompression unit couples to an output of the input buffers and receives and decompresses the compressed geometry input data. The multiplexer receives the noncompressed output from the input buffers and receives the decorepressed output from the geometry decompression unit. The multiplexer includes an output which selectively provides either the non-compressed geometry data or the decorepressed geometry input.

The command processor includes a format converter coupled to receive the output of the multiplexer which operates to convert received data into one or more types of format. The format converter provides an output to a vertex accumulator buffer which stores a plurality of geometry input data required for one or more vertices. The vertex accumulation buffer provides an output to vertex buffers which are used to construct geometric primitives. The command processor also includes a collection buffer coupled to the output of the multiplexer for receiving the non-geometric data. Each of the collection buffer and the vertex buffers provide outputs to output buffers.

BRIEF DESCRIPTION OF THE DRAWING

A better understanding of the present invention can be obtained when the following detailed description of the preferred embodiment is considered in conjunction with the following drawings, in which.

DETAILED DESCRIPTION OF THE EMBODIMENTS

Figure 1:
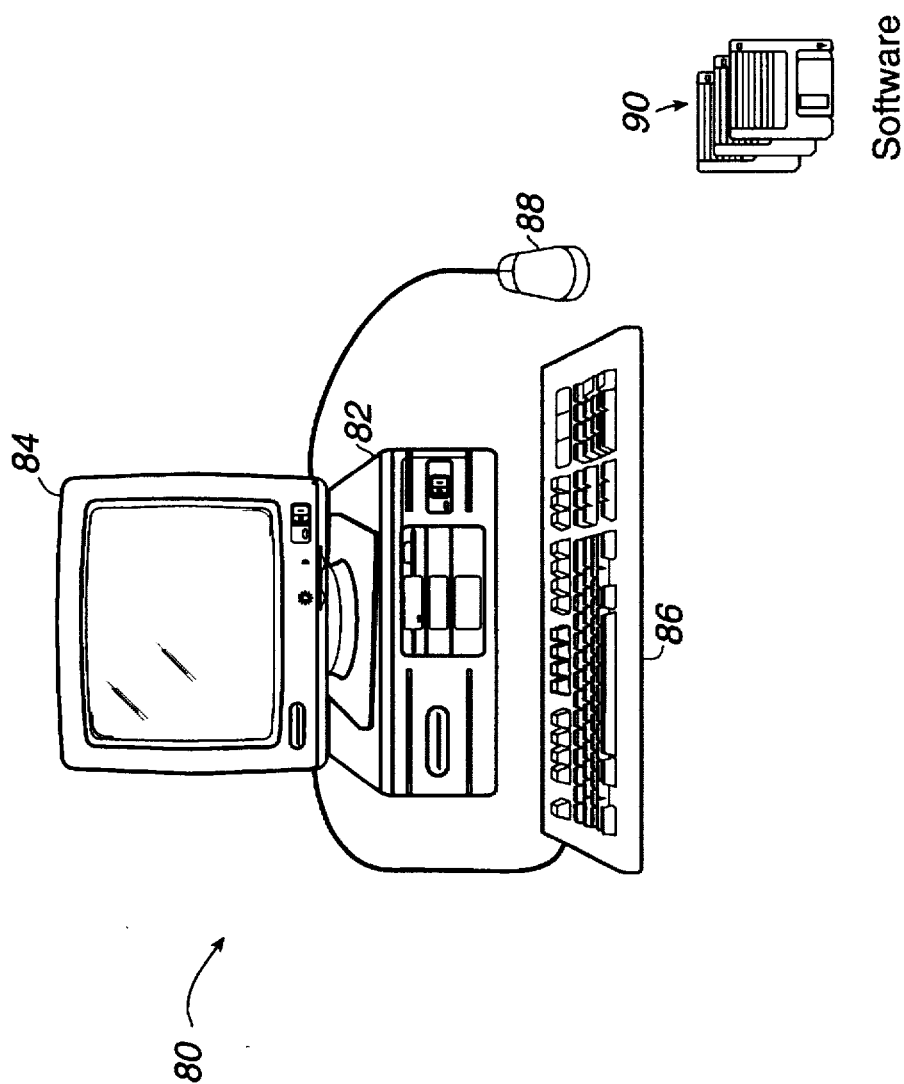
FIG. 1 illustrates a computer system which includes a three dimensional (3-D) graphics accelerator according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software, represented by floppy disks 90, may be executed by the computer system 80 to cause the system 80 to display 3-D graphical objects on the video monitor 84. As described further below, the 3-D graphics accelerator in the computer system 80 enables the display of three dimensional graphical objects with improved performance.

Figure 2:
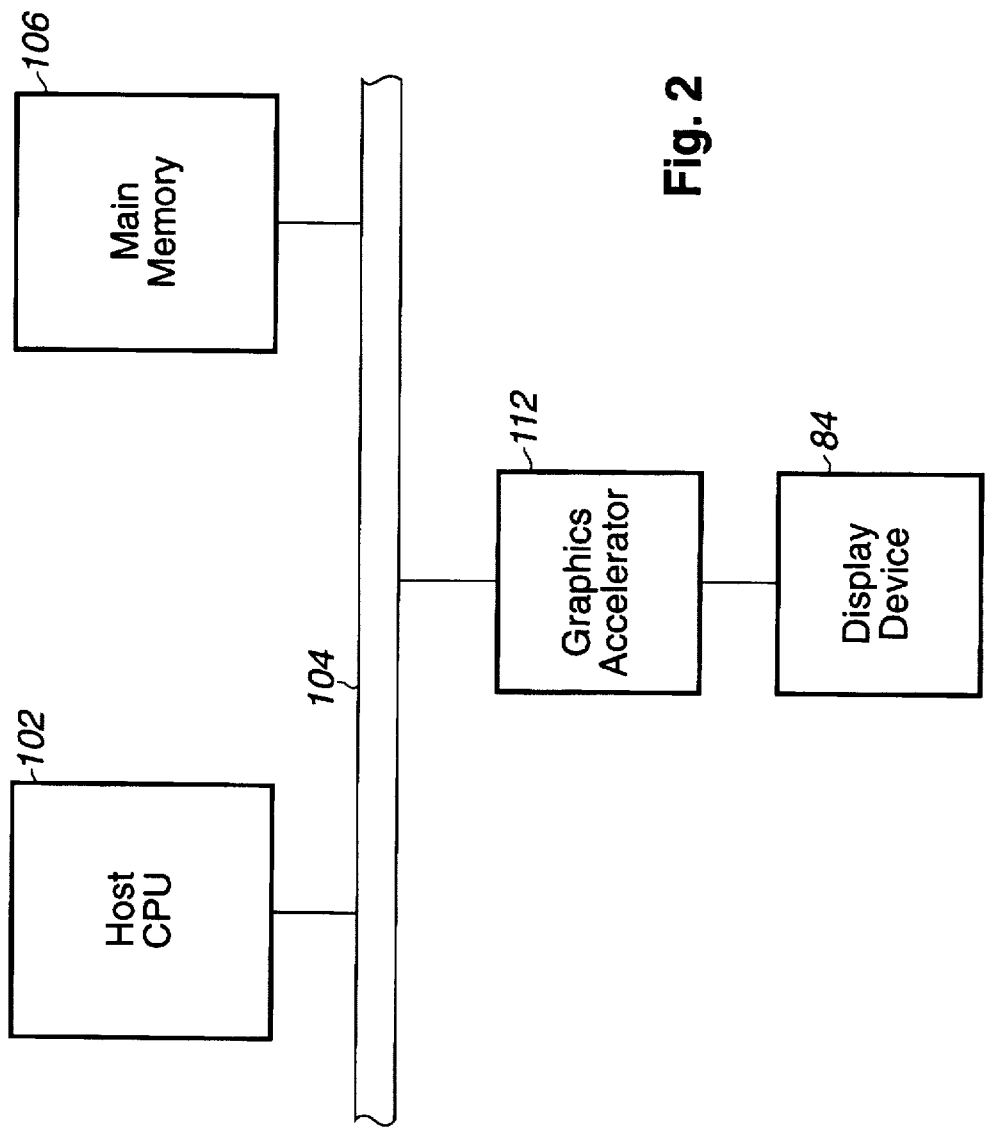
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are, not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be. coupled to the bus 104 by, for example, a cross bar switch or other bus connectivity logic. It is assumed that various other peripheral devices, or other buses, may be connected to the high speed memory bus 104, as is well known in the art. As shown, the video monitor or display device 84 connects to the 3-D graphics accelerator 112.

The host processor 102 may transfer information to and from the graphics accelerator 112 according to a programmed input/output (I/O) protocol over the host bus 104. In the preferred embodiment, data is transferred from the system memory 106 to the graphics accelerator 112 using a CPU copy (bcopy) command. In an alternate embodiment, the graphics accelerator 112 accesses the memory subsystem 106 according to a direct memory access (DMA) protocol.

A graphics application program executing on the host processor 102 generates geometry data arrays containing three dimensional geometry information that define an image for display on the display device 84. The host processor 102 transfers the geometry data arrays to the memory subsystem 106. Thereafter, the host processor 102 operates to transfer the data to the graphics accelerator 112 over the host bus 104, preferably using the bcopy command. Alternatively, the graphics accelerator 112 reads in geometry data arrays using DMA access cycles over the host bus 104. In another embodiment, the graphics accelerator 112 is coupled to the system memory 106 through a direct port, such as the Advanced Graphics Port (AGP) promulgated by Intel Corporation.

The three dimensional geometry information in the geometry data arrays comprises a stream of input vertex packets containing vertex coordinates (vertices), vertex position, and other information that defines triangles, vectors and points in a three dimensional space, which is commonly referred to as model space. Each input vertex packet may contain any combination of three dimensional vertex information, including vertex position, vertex normal, vertex color, facet normal, facet color, texture map coordinates, pick-id's, headers and other information.

Figure 3:
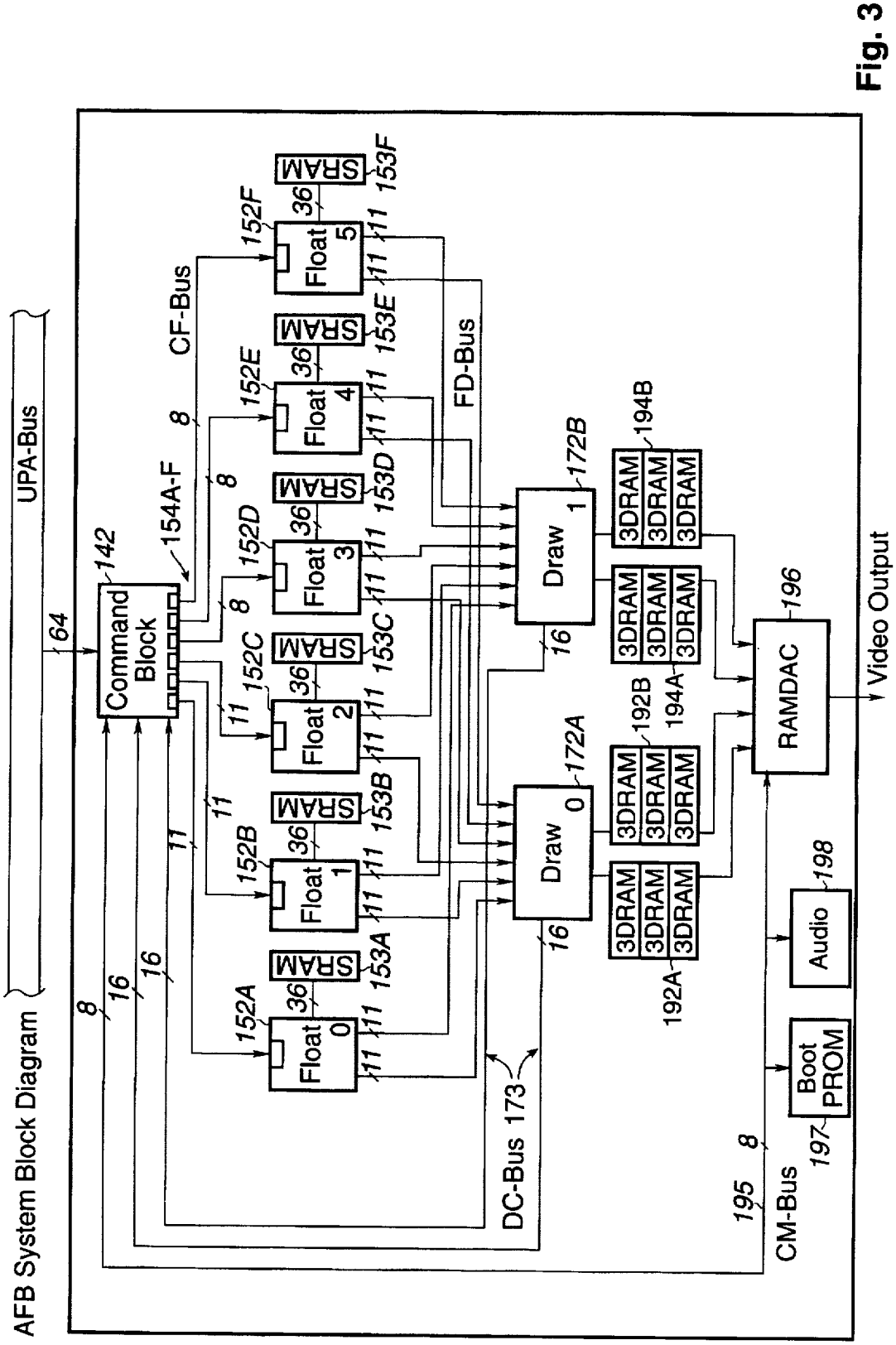
FIG. 3 is a block diagram illustrating the 3-D graphics accelerator according to the preferred embodiment of the present invention.

FIG. 3—Graphics Accelerator

Figure 4:
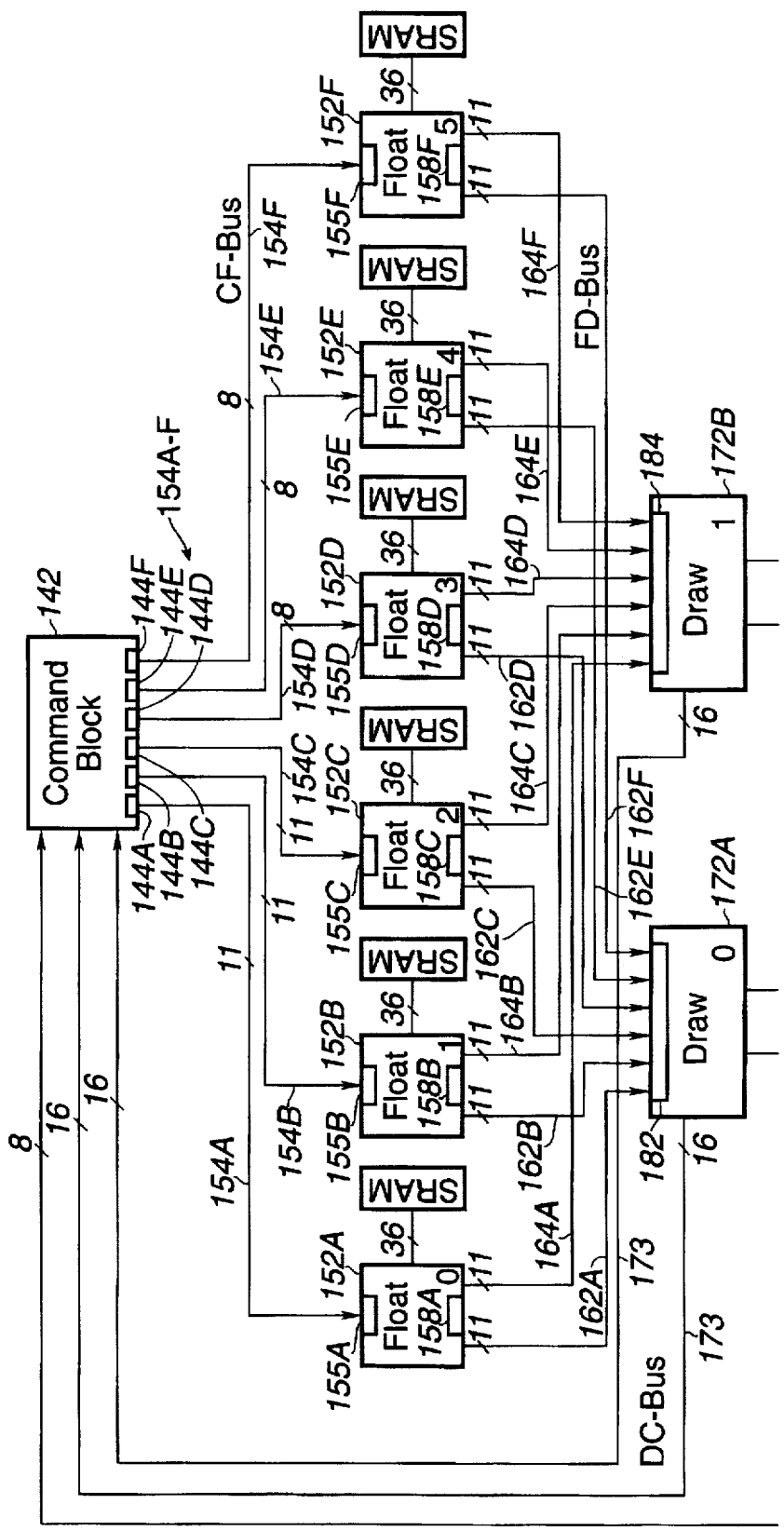
FIG. 4 is a block diagram illustrating a portion of the 3-D graphics accelerator of FIG. 3.

Referring now to FIG. 3, a block diagram is shown illustrating the 3-D graphics accelerator 112 according to the preferred embodiment of the present invention. FIG. 4 is a more detailed diagram illustrating a portion of the 3-D graphics accelerator 112. As shown, the 3-D graphics accelerator 112 is principally comprised of a command preprocessor or command block 142, a set of floating-point processors or floating point blocks 152A–152F, a set of draw processors or draw blocks 172A and 172B, a frame buffer comprised of 3DRAM, and a random access memory/ digital-to-analog converter (RAMDAC) 196.

As shown, the 3-D graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression, as described further below.

The command block 142 interfaces to a plurality of floating point blocks 152. The 3-D graphics accelerator 112 preferably includes up to six floating point blocks labeled 152A–152F, as shown. The floating point blocks 152A–152F receive high level drawing commands and generate graphics primitives, such as triangles, lines, etc. for rendering three-dimensional objects on the screen. The floating point blocks 152A–152F perform transformation, clipping, lighting and set-up operations on received geometry data. Each of the floating point blocks 152A–152F connects to a respective memory 153A–153F. The memories 153A–153F are preferably 32k ×36-bit SRAM and are used for microcode and data storage.

The command block 142 interfaces to the floating blocks 152A–152F through a plurality of point-to-point buses or direct data channels, labeled 154A–154F. Thus, the command block 142 includes a direct channel to each of the respective floating point blocks 152A–152F. The plurality of point-to-point buses or direct data channels 154A–154F are each preferably unidirectional 8 bit buses operating at 100 MHz. The direct data channels 154A–154F collectively comprise 48 bits, and the direct data channels 154A–154F are collectively referred to as the CF-bus (Command/Float bus). Data transfers across the CF-bus comprise 48 bit transfers performed over 6 cycles, with the start of the transfer synchronized among the six separate buses.

Figure 8:
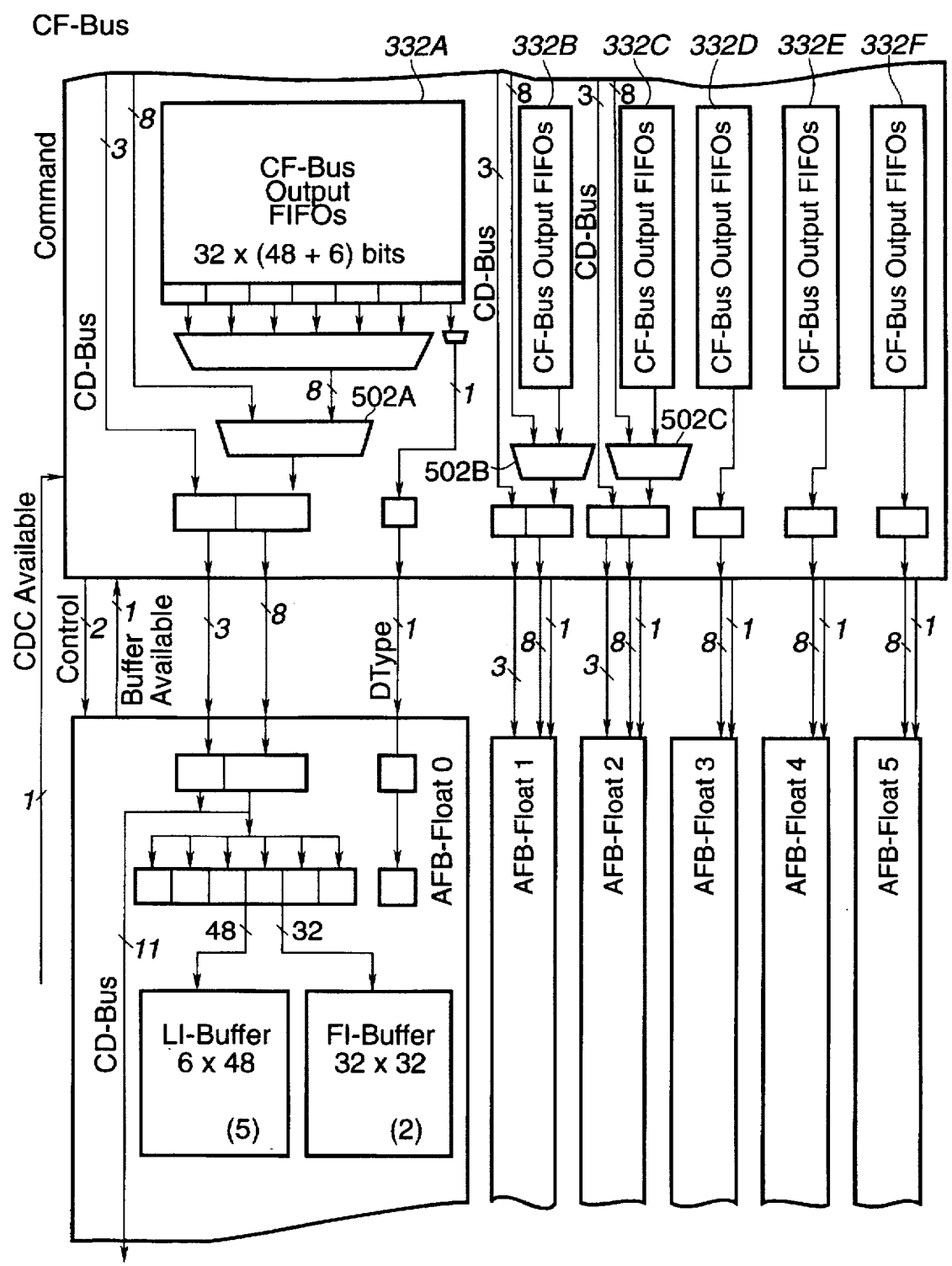
FIG. 8 is a block diagram illustrating the CF bus connecting the command preprocessor to each of the floating point processors.
Figure 9:
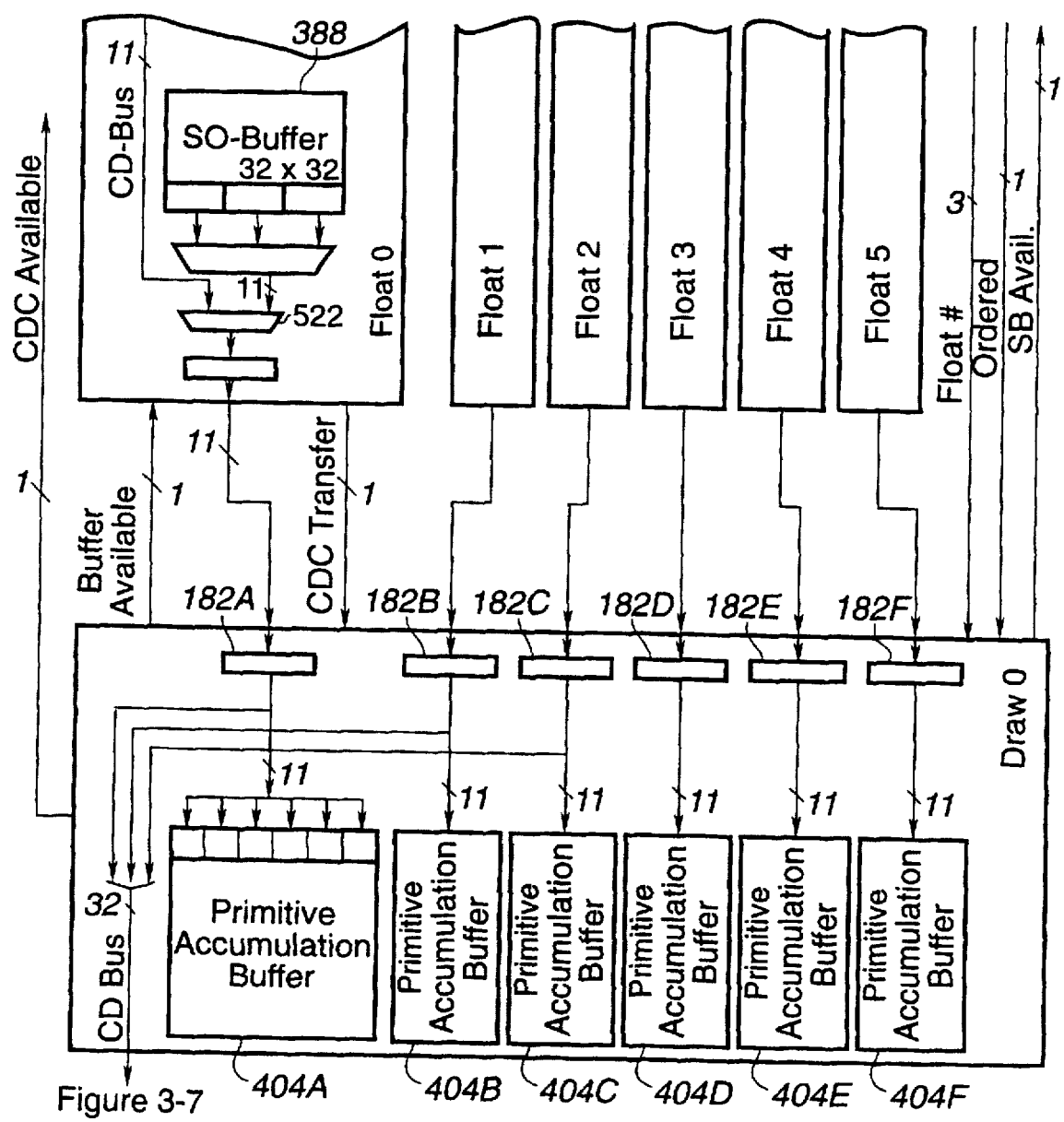
FIG. 9 is a block diagram illustrating the FD bus connecting each of the floating point processors to each of the draw processors.
Figure 10:
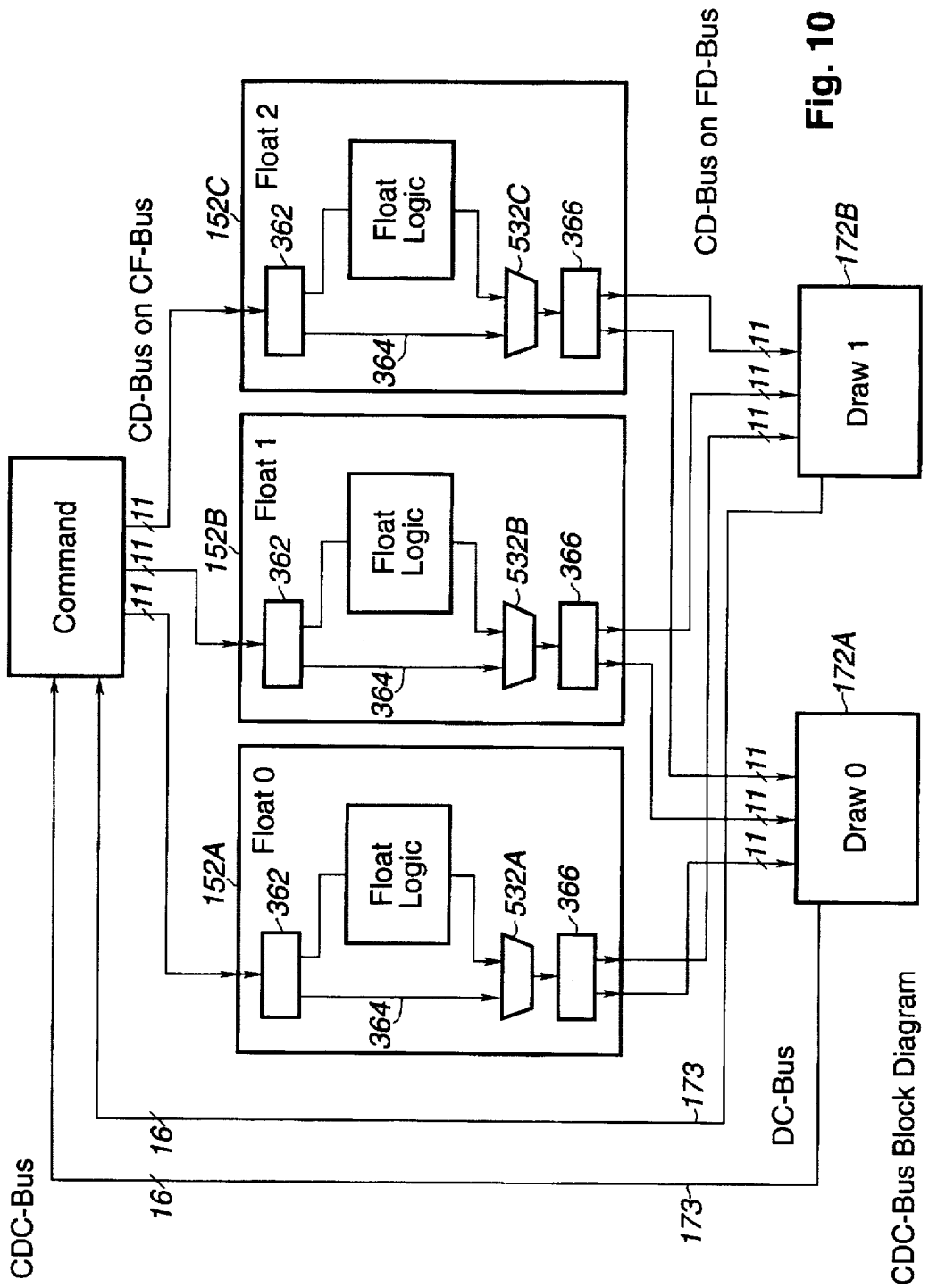
FIG. 10 is a block diagram illustrating the CDC bus connecting the command preprocessor to each of the draw processors.

As discussed further below, the CF-bus also includes 9 additional bits which combine with three of the 8 bit buses to form a 33bit bus, referred to as the CD bus (FIGS. 8–10). As shown in FIGS. 3 and 4, the buses 154A, 154B, and 154C collectively comprise the CD bus and are 11 bit buses, wherein each comprises an 8 bit bus plus 3 additional bits. The CD bus is a direct unidirectional bus from the command block 142 to draw blocks 172A and 172B. The CD bus "borrows" cycles and data lines from the CF-bus 154 to rapidly send 32 bit data from the command block 142 to the draw blocks 172A and 172B using data paths in three of the floating point blocks 152A–152C as a conduit.

As shown, the command block 142 includes separate FIFO buffers 144A–F which correspond to each of the respective channels 154A–F. These FIFO buffers 144 are used to store or buffer data before the data is transmitted on the respective channel 154A–F to the respective floating point block 152A–F. As shown, each floating point block 152A–F includes a respective input FIFO buffer 155A–155F coupled to receive data from the respective channel 154A–F.

Each of the floating point blocks 152A–F connects to each of two drawing blocks 172A and 172B. The 3-D graphics accelerator 112 preferably includes two draw blocks 172A and 172B, although a greater or lesser number may be used. The draw or rendering blocks 172A and 172B perform screen space rendering of the various graphics primitives and operate to sequence or fill the completed pixels into the 3DRAM array. The draw or rendering blocks 172A and 172B also function as 3DRAM control chips for the frame buffer. The draw processors 172A and 172B concurrently render an image into the frame buffer 100 according to a draw packet received from one of the floating-point processors 152A–152F, or according to a direct port packet received from the command preprocessor 142.

Each of the floating point blocks 152A–F connect to the two drawing blocks 172A and 172B through respective point-to-point buses or direct data channels 162A–162F and 164A–164F. As shown, each of the floating point blocks 152A–F include a respective first direct channel 162A–F to the drawing block 172A, and each of the floating point blocks 152A–F include a respective second channel 164A–F to the other drawing block 172B. Thus, each of the floating point blocks 152A–F includes a direct channel to each of the drawing blocks 172A and 172B. The plurality of point-to-point buses or direct data channels 162A–162F and 164A–164F are each unidirectional 11 bit buses operating at 100 MHz.

Thus the graphics accelerator 112 includes two sets of 6 11-bit buses, providing independent paths from each floating point block 152A–F to each draw processor 172A and 172B. The direct data channels 154A–154F collectively comprise 48 bits, and the direct data channels 162A–F and 164A–F are collectively referred to as the FD-bus (Float/Draw bus).

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both channels 162A and 164A to the draw processors 172A and 172B.

Data is transferred on the FD bus 32 bits at a time using three cycles, with no synchronization between the six separate buses. The $33^{rd}$ bit of each transfer is a control bit, which is set to 1 to indicate the last word of the primitive being transferred. In some instances, the outputs from three of the floating point blocks 152A–152C are "borrowed" for a 33 bit (32 data, 1 control) CD-bus cycle, as described above.

As shown in FIG. 4, each of the floating point blocks 152A–F include output FIFO buffers 158–which are coupled to each of the respective channels 162A–F and 164A–F. Likewise, each of the respective drawing blocks 172A and 172B include input FIFO buffers 182 and 184, respectively. As shown in FIG. 9, the drawing block 172A includes input FIFO buffers 182A–F for coupling to the respective channels 162A–F. Likewise, the drawing block 172B also includes respective FIFO buffers 184A–F (not shown) for coupling to the respective channels 164A–F.

The graphics accelerator 112 includes two unidirectional buses referred to as the CD bus (FIG. 10) and the DC bus 173 for data transfers between the command processor 142 and the draw processors 172A and 172B. The CD bus is a unidirectional bus for transfers from the command processor 142 to the draw processors 172A and 172B. As discussed above, the CD bus is partially comprised in three of the respective floating point blocks 152A–152C. The CD bus utilizes or "borrows" cycles and wires from the CF-bus, the three floating point blocks 152A–152C, and the FD bus. The DC bus 173 is a unidirectional bus for transfers from the draw processors 172A and 172B to the command processor 142, as shown in FIGS. 3 and 4. The CD bus and the DC bus are more clearly illustrated in FIG. 10.

Each of the respective drawing blocks 172A and 172B couple to a frame buffer, wherein the frame buffer comprises four banks of 3DRAM memory 192A–B, and 194A –B. The draw block 172A couples to the two 3DRAM banks 192A and 192B, and the draw block 172B couples to the two 3DRAM banks 194A and 194B, respectively. Each bank comprises three 3DRAM chips, as shown. The 3DRAM memories or banks 192A–B and 194A–B collectively form the frame buffer, which is 1280 ×1024 by 96 bit deep. The frame buffer stores pixels corresponding to 3-D objects which are rendered by the drawing blocks 172A and 172B.

Each of the 3DRAM memories 192A–B and 194A–B coupled to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The graphics accelerator 112 further includes a bi-directional bus 195, referred to as the CM bus, for connecting the command block 142 and the RAMDAC 196. As shown, a Boot PROM 197 and an Audio block 198 are coupled to the CM bus 195. The CM bus 195 preferably operates at 25 MHz.

The command block is preferably implemented as a single chip. Each of the "floating point blocks" 152 are preferably implemented as separate Chips. In the preferred embodiment, up to six floating point blocks or chips 152A–F may be included. Each of the drawing blocks or processors 172A and 172B also preferably comprise separate chips.

Direct Data Channels

As discussed above, the 3-D graphics accelerator architecture of the present invention includes a plurality of direct channels between the command block 142 and each of the floating point blocks 152A–F, as well as a plurality of direct channels between each of the floating point blocks 152A–F and the respective drawing blocks 172A and 172B.

As discussed in the background section, prior art architectures have included a common bus connecting these elements. However, the command block 142 generally operates to send separate data to each of the floating point blocks 152A–152F, generally in a round robin fashion. In other words, the command logic 142 generally operates to provide a burst transfer of data to only one of the floating point blocks 152, such as floating point block 152A, and then provide a burst data transfer to another,after floating point blocks, such as 152B, and so on. This burst nature of data transfer also occurs between each of the floating point blocks 152A–F and the two drawing blocks 172A and 172B. In other words, each of the respective floating point blocks 152A–152F generally provides respective individual burst data transfers to each of the drawing blocks 172A and 172B.

The plurality of direct data channels or point-to-point buses perform the burst data transfers between the command block 142 and each of the floating point blocks 152A–152F. The plurality of direct data channels or point-to-point buses also perform the burst data transfers between each of the floating point blocks 152A–152F and the draw processors 172A and 172B. The use of direct data paths instead of a shared bus enables the use of a number of smaller data paths, e.g., 8 bit data paths, while providing similar bandwidth to prior art designs. The use of these smaller direct data paths also provides better electrical characteristics for the graphical architecture. First, the direct data channel output pins on the command chip are only required to drive a single device, as opposed to driving multiple devices in a shared bus architecture. Also, each of the, floating point processors 152A–152F have a reduced number of pins, since each only connects to an 8 bit bus. Further, the direct data paths provide improved connectivity between multiple boards. The improved electrical characteristics also enable the user of higher clock speeds, thus providing increased transfer bandwidth.

In some instances, the command block 142 is required to send the same data to each of the floating point blocks 152A–152F. For example, if the command block 142 is required to send matrix data followed by a plurality of triangle data, and each of the subsequent triangles require use of the matrix data, then the matrix data is first required to be transferred to each of the floating point blocks 152A–152F before any of the subsequent triangles are sent to any of the respective floating point units. In other words, a floating point block 152 cannot be allowed to receive one of these subsequent triangles until the respective matrix, which is required to process the triangle, has already been received.

When the command block 142 is required to send the same data to each of the floating point blocks 152A–152F,
then the command block 142 is required to wait for all of the FIFOs 144A–144F to be empty and/or for there to be sufficient room in the respective FIFOs for this common transfer to occur. Thus, when the command block 142 is required to send the same data, i.e., broadcast data in parallel, to each of the floating point blocks 152A–152F, the command block 142 is required to wait for each of the FIFOs 144A–144F to have sufficient room in their FIFOs and is required to transfer the same data to each of the FIFOs 144A–144F. It is noted that this broadcast transfer may occur at a reduce transfer rate of a prior art system employing a common bus. However, these common transfers are generally infrequent and do not adversely effect system performance.

The floating point blocks 152A–152F may not necessarily output triangles in the exact order that these triangles are received by the command block 142. It is noted that it is generally not necessary to maintain the exact serial ordering of the received triangles. In the preferred embodiment, the 3-D graphics accelerator architecture includes a first mode where exact serial ordering of the received triangles is not maintained. The system also includes a second mode, wherein the floating point blocks 152A–152F are configured to output rendered triangles in the exact order that these triangles are received by the command block 142.

Therefore, the system and method of the present invention provides a plurality of direct channels or point-to-point buses between the command block 142 and each of the floating point blocks 152A–F. The system and method of the present invention also provides a plurality of direct channels or point-to-point buses between the floating point blocks 152A–152F and each of the drawing blocks 172A and 172B. In other words, the present invention provides a plurality of dedicated narrow buses, preferably 8-bit data buses, which connect the command block 142 to each of the floating point blocks 152A–F, as well as a plurality of narrow buses, preferably 8-bit buses, which connect each of the floating point blocks 152A–F to each of the drawing blocks 172A and 172B. Thus, the present invention does not includes a common bus or shared bus architecture for connectivity, but rather includes direct interconnections between each of the logical elements. This provides improved electrical characteristics and reduced pin requirements, and also facilitates higher clock speeds, thus providing improved performance over prior art designs.

Figure 5:
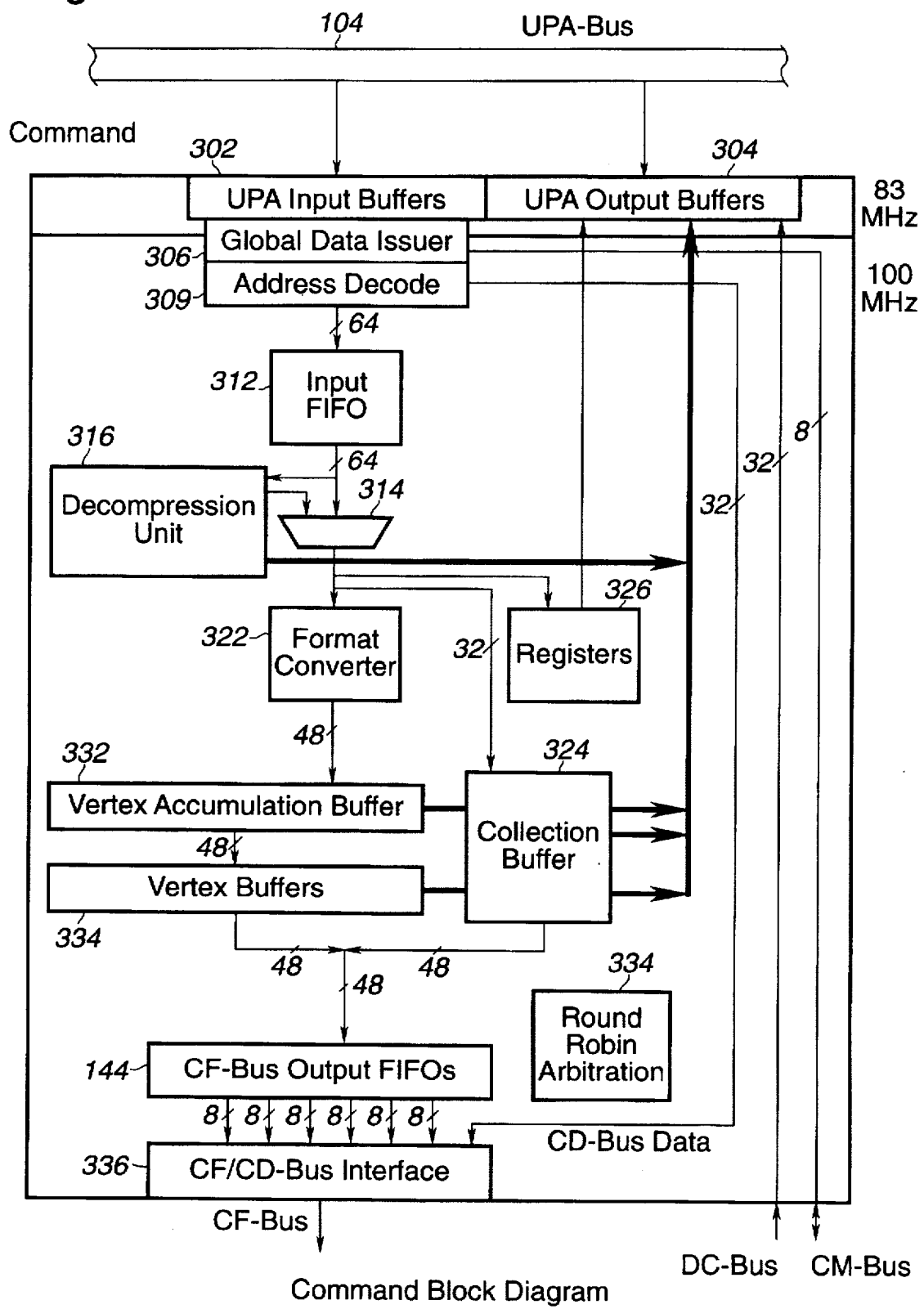
FIG. 5 is a block diagram illustrating the command preprocessor in the 3-D graphics accelerator according to the preferred embodiment of the present invention.

FIG. 5—Command Block

As discussed above, the command preprocessor or command block 142 is coupled for communication over the host bus 104. The command preprocessor 142 receives geometry data arrays transferred from the memory subsystem 106 over the host bus 28 by the host processor 102. In the preferred embodiment, the command preprocessor 142 receives data transferred from the memory subsystem 106, including both compressed and non-compressed geometry data. When the command preprocessor 142 receives compressed geometry data, the command preprocessor 142 operates to decompress the geometry data to produce decompressed geometry data.

The command preprocessor 142 preferably implements two data pipelines, these being a 3D geometry pipeline and a direct port pipeline. In the direct port pipeline, the command preprocessor 142 receives direct port data over the host bus 104., and transfers the direct port data over the command-to-draw (CD) bus to the draw processors 172A–172B. As mentioned above, the CD bus uses or "borrows" portions of other buses to form a direct data path from the command processor 142 to the draw processor 172A–172B. The direct port data is optionally processed by the command preprocessor 142 to perform X11 functions such as character writes, screen scrolls and block moves in concert with the draw processors 172A–172B. The direct port data may also include register writes to the draw processors 172A–172B, and individual pixel writes to the frame buffer 3DRAM 192 and 194.

In the 3D geometry pipeline, the command preprocessor 142 accesses a stream of input vertex packets from the geometry data arrays.

When the command preprocessor 142 receives a stream of input vertex packets from the geometry data arrays, the command preprocessor 142 operates to reorder the information contained within the input vertex packets and optionally delete information in the input vertex packets. The command preprocessor 142 preferably converts the received data into a standard format. The command preprocessor 142 converts the information in each input vertex packet from differing number formats into the 32 bit IEEE floating-point number format. The command preprocessor 142 converts 8 bit fixedpoint numbers, 16 bit fixed-point numbers, and 32 bit or 64 bit IEEE floating-point numbers. For normal and color values, the command pre-processor data to a fixed point value.

The command preprocessor 142 also operates to accumulate input vertex information until an entire primitive is received. The command preprocessor 142 then transfers output geometry packets or primitive data over the command-to-floating-point (CF) bus to one of the floating-point processors 152A–152F. The output geometry packets comprise the reformatted vertex packets with optional modifications and data substitutions.

Referring now to FIG. 5, a block diagram illustrating the command processor or command block 142 is shown. As shown, the command block 142 includes input buffers 302 and output buffers 304 for interfacing to the host bus 104. The input buffers 302 couple to a global data issuer 306 and address decode logic 308. The global data issuer 306 connects to the output buffers 304 and to the CM bus and performs data transfers. The address decode logic 308 receives an input from the DC bus as shown. The address decode logic 308 also couples to provide output to an input FIFO buffer 312.

In general, the frame buffer has a plurality of mappings, including an 8-bit mode for red, green and blue planes, a 32 bit mode for individual pixel access, and a 64 bit mode to access the pixel color together with the Z buffer values. The boot prom 197, audio chip 198 and RAMDAC 196 also have an address space within the, frame buffer. The frame buffer also includes a register address space for command block and draw processor registers among others. The address decode logic 308 operates to create tags for the input FIFO 312, which specify which logic unit should receive data and how the data is to be converted. The input FIFO buffer 312 holds 128 64-bit words, plus a 12-bit tag specifying the destination of data and how the data should be processed.

The input FIFO 312 couples through a 64-bit bus to a multiplexer 314. Input FIFO 312 also provides an output to a geometry decompression unit 316. As discussed above, the command block 142 receives both compressed and non-compressed geometry data. The decompression unit 316 receives the compressed geometry data and operates to decompress this compressed geometry data to produce decompressed geometry data. The decompression unit 316 receives a stream of 32bit words and produces decompressed geometry or primitive data. Then decompressed geometry data output from the decompression unit 316 is provided to an input of the multiplexer 314. The output of the multiplexer 314 is provided to a format converter 322, a collection buffer 324 and register logic 326. In general, the decompressed geometry data output from the decompression unit is provided to either the format converter 322 or the collection buffer 324.

In essence, the geometry decompression unit 316 can be considered a detour on the data path between the input FIFO 312 and the next stage of processing, which is either the format converter 322 or the collection buffer 324. For data received by the command processor 142 which is not compressed geometry data, i.e., non-compressed data, this data is provided from the input FIFO 3 12 directly through the multiplexer 314 to either the format converter 322, the collection buffer 324, or the register logic 326. When the command processor 142 receives compressed geometry data, this data must first be provided from the input FIFO 312 to the geometry decompression unit 316 to be decompressed before being provided to other logic.

Thus, the command block 142 includes a first data path coupled to the input buffers 302 or input FIFO 312 for transferring the non-compressed geometry data directly through the multiplexer 314 to either the format converter 322 or the collection buffer 324. The command block 142 also includes a second data path coupled to the input buffers 302 or input FIFO 312 for receiving compressed geometry data. The second data path includes a geometry decompression unit coupled to an output of the input FIFO 312 for receiving and decompressing the compressed geometry input data to produce decompressed geometry input data.

The format converter 322 receives integer and/or floating point data and outputs either floating point or fixed point data. The format converter 322 provides the command processor 142 the flexibility to receive a plurality of different data types while providing each of the floating block units 152A–152F with only a single data type for a particular word.

The format converter 322 provides a 48-bit output to a vertex accumulation buffer 332. The vertex accumulation 332 in turn provides an output to vertex buffers 334. The vertex accumulation buffer 332 and the vertex buffers 334 provide outputs to the collection buffer 324, which in turn provides an output back to the output buffers 304.

The vertex accumulation buffer 332 is used to store or accumulate vertex data required for a primitive that is received from the format converter 322. The vertex accumulation buffer 332 actually comprises two sets of registers, i.e., is double buffered. The first set of registers is used for composing a vertex, and the second set of registers is used for copying the data into one of the vertex buffers 334. As discussed further below, these two sets of registers allow for more efficient operation. Data words are written one at a time into the first or top buffer of the vertex accumulation buffer 332, and these values remain unchanged until a new value overwrites the respective word. Data is transferred from the first set of registers to the second set of registers in one cycle when a launch condition occurs.

The vertex buffers 334 are used for constructing or "building up" geometric primitives, such as lines, triangles, etc. Lines and triangles require two and three vertices, respectively, to complete a primitive. According to one embodiment of the invention, new primitives may be created by replacing a vertex of an existing primitive when the primitive being created shares one or more vertices with the prior created primitive. In other words, the vertex buffers 334 remember or maintain previous vertex values and intelligently reuse these vertex values when a primitive or triangle shares one or more vertices or other information with a neighboring primitive or triangle. This reduces the processing requirements and makes operation of the Open GL format operate more efficiently. In the preferred embodiment, the vertex buffers 334 can hold up to seven vertices. This guarantees maximum throughput for the worse case primitive, i.e., independent triangles. The vertex buffers 334 also operate at optimum :speed for dots, lines and triangles and is substantially optimal for quad primitives.

Each of the vertex accumulation buffer 332 and the vertex buffers 334 are coupled to a collection buffer 324. The collection buffer 324 provides respective outputs to the output buffers 304 as shown. The vertex buffers 334 are coupled to provide outputs to CF bus output FIFOs 144. The collection buffer 324 is also coupled to provide outputs to the CF bus output FIFOs 144. The collection buffer 324 is used for sending all non-geometric data to the floating point blocks 152A–152F. The collection buffer 324 can hold up to 32 32-bit words. It is noted that the operation of copying data into the CF-bus output FIFOs 144 may be overlapped with the operation of copying new data into the collection buffer 324 for optimal throughput.

As mentioned above, the command block 142 includes a plurality of registers 326 coupled to the output of the multiplexer 314. The registers 326 also provide an output to the UPA output buffers 304. Register block 326 comprises 16 control and status registers which control the format and flow of data being sent to respective floating point blocks 152A–152F.

Each of the vertex buffers 334 and the collection buffer 324 provides a 48-bit output to CF-bus output FIFOs 144. The CF-bus output FIFOs 144 enable the command block 142 to quickly copy a primitive from the vertex buffers 334 into the output FIFO 144 while the last of the previous primitive is still being transferred across the CF-bus. This enables the graphics accelerator 112 to maintain a steady flow of data across each of the point-to-point buses. In the preferred embodiment, the CF-bus output FIFOs 144 have sufficient room to hold one complete primitive, as well as additional storage to smooth out the data flow. The CF output FIFOs 144 provide respective 8-bit outputs to a bus interface block 336. The bus interface 336 is the final stage of the command processor 142 and couples to the CF-bus as shown. In addition, the CF/CD bus interface 336 provides "direct port" accesses to the CDC bus which are multiplex on the CF-bus as mentioned above.

The command block 142 also includes round robin arbitration logic 334. This round robin arbitration logic 334 comprises circuitry to determine which of the respective floating point processors 152A–152F is to receive the next primitive. As discussed above, the graphics accelerator 112 of the present invention comprises separate point-to-point buses both into and out of the respective floating point processors 152A–152F. Thus, the round robin arbitration logic 334 is included to distribute primitives evenly between the chips and thus maintain an even flow of data across all of the point-to-point buses simultaneously. In the preferred embodiment, the round robin arbitration logic 334 utilizes a "next available round robin" arbitration scheme, which skips over a sub-bus that is backed up, i.e., full.

For information on a prior art embodiment of a command processor, please see U.S. Pat. No. 5,408,605 titled "Command Preprocessor for a High Performance Three Dimensional Graphics Accelerator", which is hereby incorporated by reference in its entirety.

Figure 6:
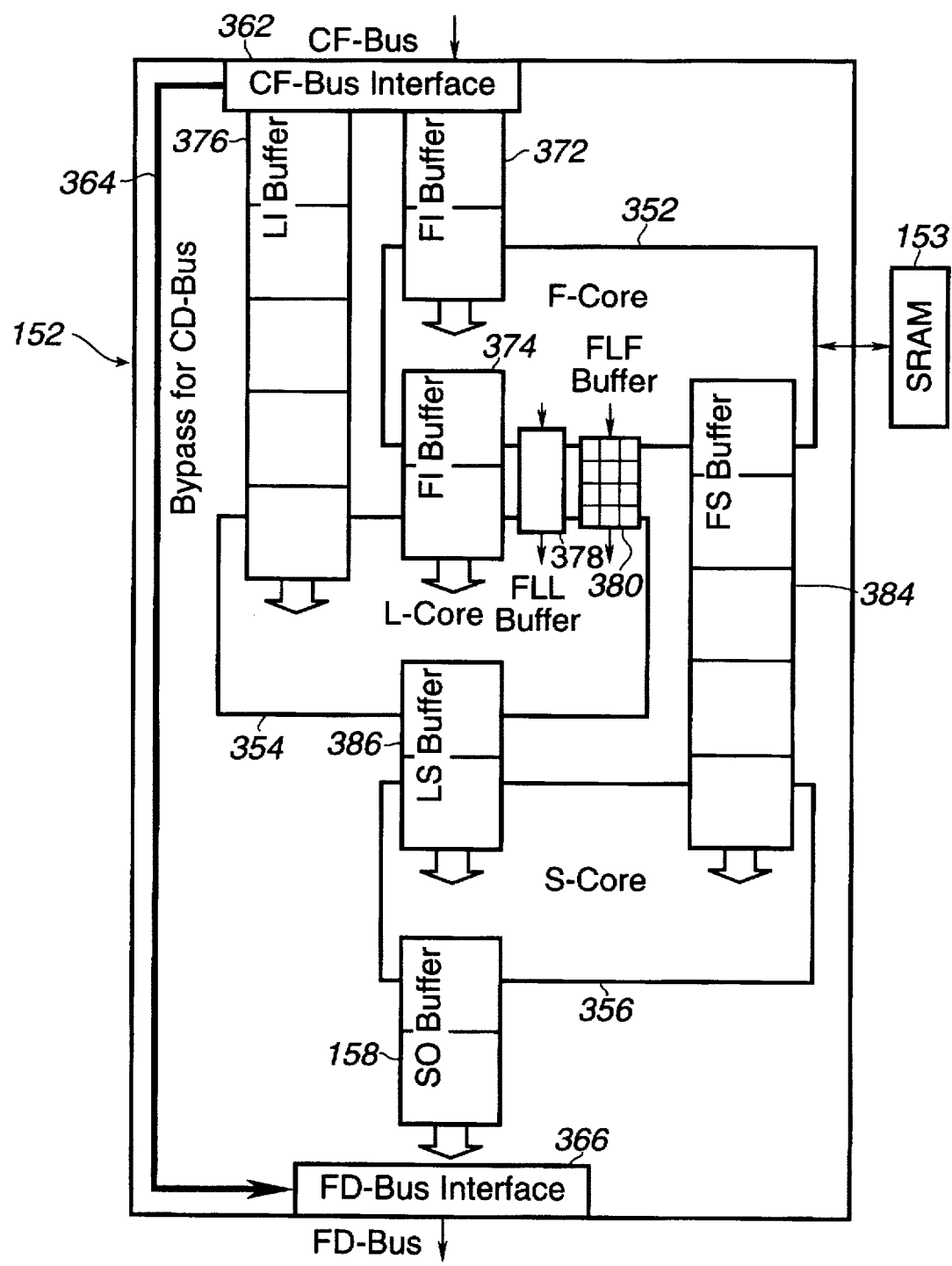
FIG. 6 is a block diagram illustrating one of the floating point processors in the 3-D graphics accelerator according to the preferred embodiment of the present invention.

FIG. 6—Floating Point Processor Block Diagram

Referring now to FIG. 6, a block diagram illustrating one of the floating point blocks or processors 152 according to the preferred embodiment of the present invention is shown. Each of the respective floating point processors 152A–152F are identical, and thus only one is described here for convenience. As shown, each of the floating point blocks 152 includes three main functional units or core processors, these being F-core 352, L-core 354, and S-core 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point intensive operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32k word SRAM.

The L-core block 354 performs substantially all lighting calculations using on-chip RAM-based microcode. Lighting calculations are tuned for the color to vertex format. The L-core block 354 block also includes an efficient triple-word design for more efficient lighting calculations. This triple-word design operates with, a 48-bit data word comprising 16-bit fixed point values. Thus one instruction can perform the same function on all three color components (RGB) are all three components of a normal ($N_x$, $N_y$, and $N_z$) in one cycle. The math units comprised in the L-core block 354 automatically clamp values to the allowed ranges, thus allowing no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152. The operation of this bypass bus 364 is shown more clearly in FIG. 10 and is discussed in conjunction with FIG. 10.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16bit fixed point numbers.

As shown in FIG. 6, the floating point block 152 includes six combined input and output buffers, as well as two specialized buffers which provide communication between the F-core block 352 and the L-core block 354.

As shown, the floating point block 152 includes a float input buffer (FI buffer) 372 which receives data from the CF-bus which was provided by the command block 142. The FI buffer 372 is double buffered and holds 32 32-bit entries in each buffer. The first word, word zero, stored in the FI buffer 372 comprises an op code which informs the F-core block 352 which microcode routine to dispatch for the received geometric primitives. Only the header and X, Y and Z coordinates are provided to this buffer.

The floating point block 152 also includes an F-core to L-core buffer (FL buffer) 374. The FL buffer 374 is double buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute lighting direction. When lighting attributes are written, however, five separate values are sent from the F-core block 352 to the L-core block 354 through the FL buffer 374, these five values being values for emission, ambient, diffuse, specular and specular exponent variables.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48obit entries comprise three vertex normals, three vertex colors and one word with three alpha values. The FI buffer 372 and the LI buffer 376 collectively comprise the floating point block input buffer 155 (FIG. 4).

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is a double buffer with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. The SO buffer 158 includes a separate status register which indicates how many words are valid so that the minimum number of cycles are used to transfer the data across the bus. The SO buffer 158 comprises the floating point block output buffer 158.

For information on another embodiment of the floating point block 152, please see U.S. Pat. No. 5,517,611 titled "Floating Point Processor for a High Performance Three Dimensional Graphics Accelerator", which is hereby incorporated by reference in its entirety.

Figure 7:
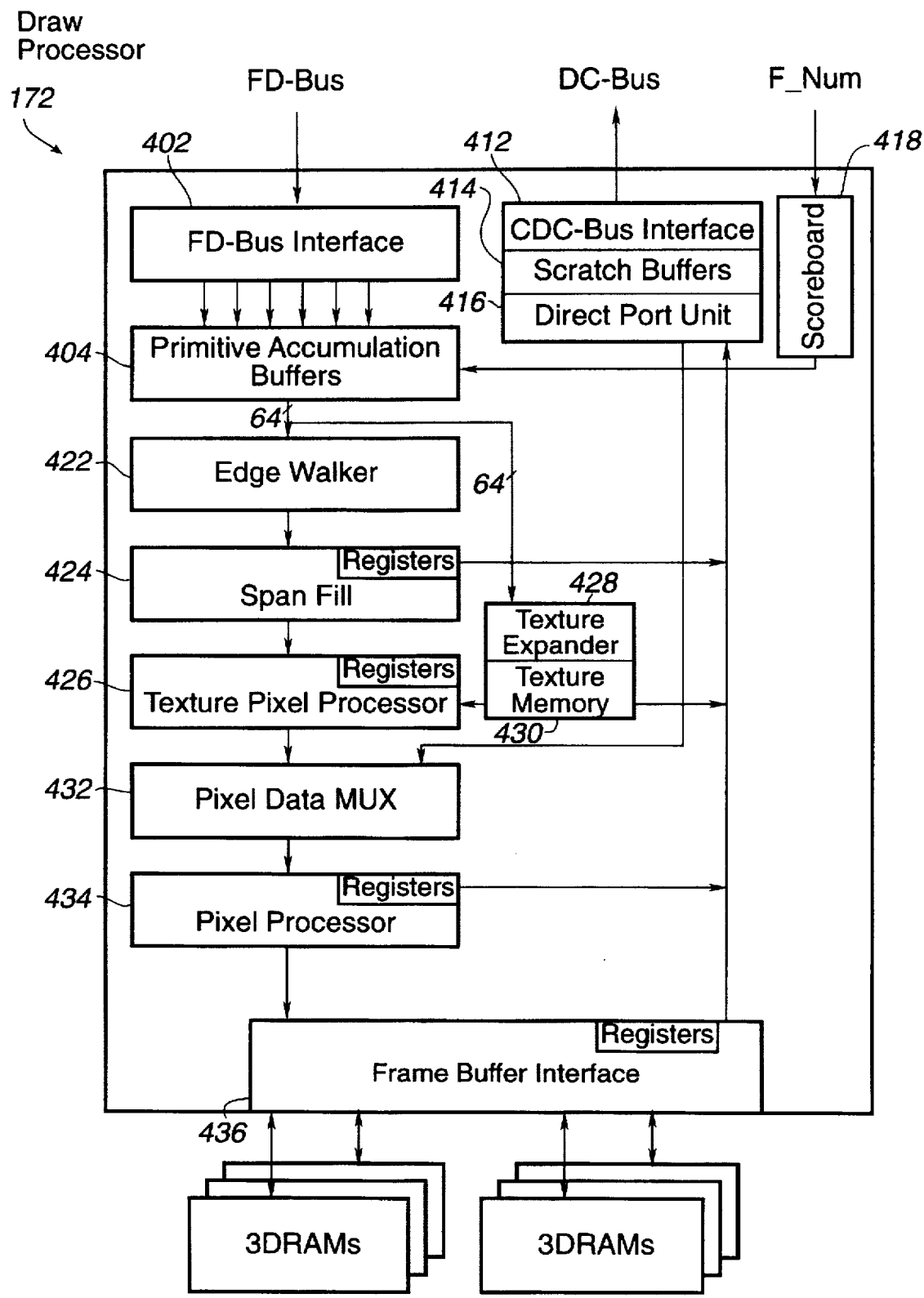
FIG. 7 is a block diagram illustrating one of the draw processors in the 3-D graphics accelerator according to the preferred embodiment of the present invention.

FIG. 7—Draw Processor Block Diagram

Referring now to FIG. 7, a block diagram illustrating one of the respective draw processors 172 is shown. Each of the respective draw processors 172A and 172B are identical, and thus only one is described here for convenience. The draw processor 172 manages the sequencing of the 3DRAM chips. Each draw processor 172 comprises 3DRAM scheduling logic for both internal pixel caches and video output refresh. These resources are controlled by queuing up rendered pixels before they reach the 3DRAM and snooping the pixel addresses in this queue to predict 3DRAM cache misses.

As shown, each draw processor 172 includes an FD bus interface block 402 for interfacing to the FD bus. The FD bus interface block 402 couples to CDC bus interface logic 412. The CDC bus interface logic 412 couples to scratch buffers 414 and a direct port unit 416. The direct port unit 416 receives input from frame buffer interface logic 436 and provides an output to pixel data mux logic 432. The CDC bus interface logic 412 also couples to provide output data to the DC bus. The FD bus interface 402 provides outputs to primitive accumulation buffers 404.

As noted above, the FD bus comprises six independent buses that are synchronized only on a per word basis. The FD bus interface 402 serves two functions. First, the FD bus interface 402 converts each set of three 11-bit data pieces transferred across the FD bus back into a 32-bit word, plus a control bit. Secondly, the FD bus interface 402 directs received data from the FD bus either to primitive accumulation buffers 404 or to CD bus interface logic 412.

The CDC bus interface logic 412 operates with 32-bit data words. As described above, the CDC bus comprises portions of other buses, including the CF-bus and FD bus and is used for allowing the command block 142 to transfer pixels into the 3DRAM chips 192 and 194. The DC bus allows the reading of registers from the draw processor 172, as well as reading pixels from 3DRAM. Data which is provided to one of the draw processors 172 on the CD bus requires a header as a first word. Data which is provided back on the DC bus has no headers since the command block 142 always knows what was requested.

The draw processor 172 also includes scoreboard 418 which keeps track of primitive ordering as specified by the command processor 142. As shown, the scoreboard logic receives an $F_{13}Num$ input and provides an output to the primitive accumulation buffers 404. The command block 142 provides a 3-bit code to the draw processor 172 every time a (unicast) primitive is copied into one of the CF-bus output FIFOs. The code specifies which of the six floating point block processors 152A–152F receive the primitive. The code also includes a bit which indicates whether the primitive is ordered or unordered. All ordered primitives are required to come out in the order that they were put in. Unordered primitives may be taken from the primitive accumulation buffers 404 whenever they become available. Some primitives, such as text and markers, output multiple primitives for each primitive input, and these primitives are preferably placed in unordered mode for efficiency. However, all attributes sent to the draw processor 172 must remain ordered relative to primitives they might modify. In addition there are cases with lines and triangles where strict ordering must also be preserved. The scoreboard logic 418 keeps track of at least 64 primitives. The scoreboard logic 418 provides a signal back to the command block 142 when the scoreboard logic 418 is close to being full, in order to prevent overflowing the scoreboard buffer 418.

As mentioned above, the primitive accumulation buffers 404 receive outputs from the FD-bus interface 402 and from the scoreboard logic 418. The primitive accumulation buffers 404 provide an output to edge walker logic 422 which in turn provides an output to span fill logic 424. The span fill logic 424 provides an output to a texture pixel processor 426. The span fill logic 424 also provides an output to the direct port unit 416.

The primitive accumulation buffers 404 also provide an output to texture expander logic 428. The texture expander logic 428 couples to texture memory 430. The texture memory 430 provides data to the texture pixel processor 426. The texture memory 430 also provides data to the direct port unit 416. The texture pixel processor 426 and the direct port unit 416 each provide data to the pixel data multiplexer 432. The pixel data multiplexer 432 provides its output to a pixel processor 434. The pixel processor 434 provides its output to the frame buffer interface 436, and also provides output to the direct port unit 416.

The primitive accumulation buffers 404 are used to accumulate primitive data until a complete primitive has been received. Thus, as data is collected from the six floating point processors 152A–152F, the data eventually forms complete primitives. The primitive accumulation buffers 404 include enough room to hold one complete primitive, plus sufficient storage to hold a portion of a second primitive to maintain the pipeline flowing smoothly. The six Primitive Accumulation buffers 404 are filled as data comes in from each of the six floating point processors 152A–152F. As soon as the primitive has been fully received, in general the next one will be coming behind it. Thus, the primitive accumulation buffers 404 include sufficient extra buffering to transfer the completed primitive out of the primitive accumulation buffer 404 to the edge walker logic 422 before the data gets full from the data coming in from the next primitive. In the preferred embodiment, the primitive accumulation buffers 404 are several words larger than the largest primitive (triangle) that will be processed. The primitive accumulation buffers 404 provide a 64-bit output to the edge walker logic 422. The primitives are removed from the primitive accumulation buffers 404 one at a time based on the contents of the scoreboard logic 418.

The edge walker logic 422 partitions primitives into pieces that may easily be handled by the span fill unit 424. For triangles, the edge walker logic 422 walks along the two current edges and generates a pair of vertical spans adjusted to the nearest pixel sample point, which are then sent to the span fill unit 424. The edge walker unit 422 also performs similar adjustment for lines, sending a line description to the span field unit 424 that is very similar to a triangle span. The edge walker logic 422 comprises two 16×24 multipliers used to perform these adjustments. The edge walker logic 422 further includes several adders which keep track of counts used to make other computations. Primitives other than triangles and lines are split up depending on the most efficient use of resources. Both jaggy and anti-aliased dots are sent straight through the logic with a minimum of adjustments, such as adding 0.5 to jaggy dots. Big dots are provided through the edge walker logic 422 as individual pixels. The edge walker logic 422 converts polygons and rectangles to horizontal spans. The edge walker logic 422 doe, s not modify Bresenham lines in any way before being sent onto the span fill unit 424.

The span fill unit 424 performs an interpolation of values across arbitrarily oriented spans, usually for triangles and lines, and also performs filter weight table look ups for anti-aliased lines. For optimized primitives, including triangle span pairs, rectangle and polygon spans, and anti-aliased lines and dots, two pixels are generated per cycle. All other primitives generate one pixel per cycle. The final stage of the span fill unit 424 also performs dithering, converting 12-bit colors to 8-bit values using a 4×4 screen space dither pattern. The span fill logic 424 provides output to the texture pixel processor 426.

The texture pixel processor 426 performs texture calculations and controls the look up of texels in the texture memory 430. The texture pixel processor 426 produces a color to be merged in to the pixel by the pixel processor 434. The texture pixel processor 426 passes data onto pixel data multiplexer 432 for all other primitives except for textured triangles.

As mentioned above, the primitive accumulation buffers 404 provide an output to the texture expander 428. The texture expander 428 operates to expand received textures for storage in the texture memory 430. The texture memory 430 is thus loaded directly from the primitive accumulation buffers 404 and is connected to the texture pixel processor for texel look-ups. The texture memory 430 is designed to hold enough data to texture map a 16×16 texel region, including all of the smaller mipmaps. The texture memory 430 is preferably double buffered so than one buffer can be loaded while the current buffer is in use. It is noted that the 16×16 texel region is actually stored as a 17×17 array to enable the interpolation to operate correctly.

As mentioned above, the pixel data multiplexer 432 receives input data from the texture pixel processor 426 and the direct port unit 416. The pixel data mux logic 432 arbitrates between pixels coming from the span fill unit 424 and those coming from the CD bus. Pixels from the CD bus are always given priority. The pixel data multiplexer 432 provides its output to the pixel processor 434.

The pixel processor 434 performs blending, anti-aliasing, depth cueing and sets up for logical operations in the 3DRAM 192 and 194. The pixel processor 434 also comprises logic which is operable to prevent a pixel write for operations such as line patternings, stencil patterning, V port clipping, and so forth. The pixel processor 434 provides an output to the frame buffer interface 436.

The frame buffer interface 436 comprises logic necessary to read and write pixels from the 3DRAM memories 192 and 194. The frame buffer interface 436 manages the level 1 (L1) and level 2 (L2) caches in the 3DRAM chips. This is performed by looking ahead to the pixels to be written and paging in the needed cache while other pixel accesses are occurring. The frame buffer interface 436 in turn couples to each of the 3DRAM memories 192 and 194 as shown.

FIG. 8—CF-bus Diagram

Referring now to FIG. 8, a block diagram is shown illustrating the CF-bus as well as the relevant buffers inside the command block 142 and respective, floating point processors 152A–152F. As described above, the command processor 142 is coupled to the respective floating point blocks 152A–152F. As shown in FIG. 8, as data leaves the vertex buffers 344 in the command block (FIG. 5), the data is separated into six separate CF-bus Output FIFOs 144A–144F. The CF-bus output FIFOs 144A–144F are collectively referred to as FIFOs 144 in FIG. 5. Each CF-bus output FIFO 144A–144F is connected to a respective floating point block 152, and each CF-bus output FIFO 144A–144F operates independently while sending data to the floating point block 152 to which it is connected. All data transfers on the CF-bus are 48bit words plus a 6-bit code. Each word is transmitted as six 8-bit pieces, most significant bits first, and the code is transmitted as six 1-bit pieces.

The 48-bit words are synchronized among the six separate paths. The first 8-bit piece of a 48-bit word is transferred on the same cycle for all six paths. If one of the paths does not have data ready when a 48-bit transfer beings, it must wait until the next 48-bit word transfer cycle. There is no synchronization relative to the start of primitives, however. The words of a primitive may be transferred whenever they are available to be transferred.

As the data pieces are received by the respective floating point processor 152, they are reassembled into a 48-bit word. The 6-bit code is also assembled and informs the floating point processor 152 what to do with the data. Floating point data, such as for passthrough data, is pulled from the lower 32 bits and stored into the FI-buffer 372 for processing by the F-core 352. Normals, sent as three 16-bit numbers packed into a 48-bit word, are stored into the LI-buffer 376 for processing by L-core 354. Combined colors and vertices are unpacked with 16 bits going to the LI-buffer 376 and 32-bits going to the FI-buffer 372.

CD-Bus Borrows CF-Bus Data Lines

As shown in FIG. 8, the CF-bus includes extra wires labeled as the CD-bus. Logically, the CD bus is independent from the CF-bus. However, the CD bus shares or "borrows" the data lines from the CF bus and uses the floating point processors 152 as buffer chips. As shown, three of the CF-bus output FIFOs 144A–144C provide data to respective multiplexers 502A–502C. These multiplexers also receive 8-bit data comprising the CD-bus. A 3-bit portion of the CD-bus is also provided on the final output stage of the command block 142.

When a 32-bit word is to be transferred from the command block 142 to the draw processor 172, one cycle is "borrowed" from the CF-bus. The transfer from the CF-bus output FIFOs 144 is halted for one cycle and the CD-bus data is directed onto the bus. To match up with the 11-bit data path from the floating point processors 152 to the draw processors 172, three more lines are added to each of the first three command to float (CF) data paths. This provides 33 bits for transferring the 32-bit word, using three of the six floating point processors 152.

The data transferred across the CD-bus is inserted after the last stage of a command processor output and is pulled back out of the data stream in the floating point processor 152 before any processing stages. The only disruption of CF-bus data transfers is the one cycle borrowed to transfer the data through. In the preferred embodiment, all six floating point processors 152 have this one cycle "hiccup", even though three of them take in no special data. More detail about CD-bus transfers at the floating point processor outputs is contained below.

FIG. 9—FD Bus

FIG. 9 illustrates the FD-bus, which is the bus from the floating point processors 152 to the draw processors 172. FIG. 9 is a block diagram of the FD-bus showing the relevant buffers inside a respective floating point processor 152 and a draw processor 172. It is noted that, physically, there are separate wires from each the floating point processor 152 to each of the two draw processors 172, as shown in FIGS. 3 and 4, even though FIG. 9 only shows the wires to one of the draw processors 172. Logically the wires are the same going to both draw processors 172, since they always have the same data on them.

As data is produced by the setup unit (S-core), it is written to the SO-buffer 158. Each word in this buffer is 32 bits. Each word is taken from the SO-Buffer 158 in three 11-bit pieces, most significant bits first, and sent across the FB-Bus 11 bits at a time. The data words are then reassembled back into 32-bit words in the draw processor 172. The $33^{rd}$ bit is set to "1" for the last word of the primitive. This eliminates the need for any word counts sent across the bus.

As shown, each SO-buffer 158 provides its output to a multiplexer 522. The multiplexer 522 also receives an 11-bit input from the CD-bus. As with the CF-bus, the FD-bus also loans out some of its data lines for the CD-bus. Logically, the CD-bus is independent from the FD-bus, but the CD-bus may borrow one cycle at any time to transfer a 32-bit data word. When a CD-bus transfer takes place, the FD-bus is halted for one cycle and the CD-bus data is directed onto the bus. The 32-bit data transfer uses three sets of 11 data lines from floating point processors 152A–152C. The data lines from floating point processors 152D–152F are ignored during this transfer. When the data enters the draw processors 172, it is immediately redirected to the internal CD-bus, instead of going into the primitive accumulation buffer 404 as does all other data.

FIG. 10—CDC Bus

FIG. 10 illustrates the CDC-bus, which was discussed above. Logically, the CDC-bus can be thought of as a 32-bit wide bi-directional data bus between the command processor 142 and the draw processor 172. Actually, the CD-bus is comprised of two unidirectional buses: the CD-bus going from the command processor 142 to each of the draw processors 172A and 172B, and the DC-bus going from each of the draw processors 172A and 172B to the command processor 142.

The CDC bus is the "direct port" path from the command processor 142 into the frame buffer, i.e., the 3DRAM memories 192 and 194. The CDC bus is used for writing pixels into the frame buffer. The CDC bus is also used for reading back registers and pixels as well as for reading back the contents of the floating point block SRAM. As discussed below, the CD-bus borrows some wires from the CF-bus and the FD-bus and uses the floating point processors 152A–152F as a two-stage buffer. Cycles are borrowed from these two buses one word at a time on demand.

As shown in FIG. 10, the CD-bus is carried over the CF-bus and is provided to the input buffer 362 of three respective floating block chips 152A–152C. If the data transfer is a CF-bus transfer, the data is provided to the float logic, as shown. However, if the data transfer is a CD-bus transfer, the data is provided from the respective FIFO or bus interface directly to the respective multiplexers 532A–532C in the respective floating point processors 152A–152C. The output from each of the multiplexers 532A–532C is provided through respective output buffers 366 to the FD-bus and then to the respective draw processors 172A and 172B.

Data transferred along the CD bus or bypass bus interrupts the normal CF-bus transfer cycle and is sent back out of the respective floating point blocks 152 as quickly as possible. The transfer latency through the floating point blocks 152 is two cycles over this bypass bus. The bypass bus data path 364 is 11 bits wide. As described above, three of the respective floating point processors, preferably the processors 152A, 152B and 152C, are collectively used to transfer a 32-bit word. As also noted above, the $33^{rd}$ bit of these three 11 bit buses is used to indicate an end of transfer condition. As shown, the bypass bus 364 receives data from the CF-bus interface 362 and is coupled to provide the data to the FD bus interface 366. Thus the CD bus utilizes a portion of the CF bus, a portion of the FD bus, and an internal data path to three of the floating point blocks 152A-152C.

In the majority of cases, the command block 142 provides data to each of the draw blocks 172A and 172B provided through the floating point logic in the floating point blocks 152A-152F as described above. However, in some instances, the command block 142 desires to provide data directly to the draw blocks 172A and 172B quickly without requiring passage through the floating point logic. In this instance, the command block 142 uses the CD bus. The CD bus is primarily used to enable the command block 142 to provide data directly to the frame buffer, bypassing the floating point logic in the floating point processors 152. As described above, a substantial portion of the CD bus is provided "on chip" in three of the floating point blocks 152A-152C. This reduces the required board space.

In one embodiment, during the time that the CD bus or bypass channel 364 is being used to transmit data directly from the command block 142 to the draw blocks 172A and 172B, each of the respective floating point blocks 152 may be processing other data during this time. This thus allows concurrent operations to occur, providing greater system efficiency.

As also shown in FIG. 10, each of the draw processors 172A and 172B include a direct data path, referred to as the DC bus 173, which is coupled to the Command block 142. The DC-bus is the data path back from each of the draw processors 172A and 172B to the command processor 142. The DC bus comprises two 16bit unidirectional point to-point buses. Data sent across the DC-bus always comprises pairs of 16bit words which are collected into 32bit words in the command block 142. When pixels are being read back, the data will be different from the two draw processors 172, the command processor 142 sorts this data back into the sequence needed by the host CPU 102. When a single pixel is read from the draw processors 172A and 172B, only one draw processor 172 sends the data back and half of the total 32bit wide data path remains idle.

The DC bus provides a return path for pixels from each of the draw blocks 172A and 172B back to the command block 142. Thus, when the command block 142 requests to read pixels in the draw blocks 172A and 172B, the draw blocks 172A and 172B provide this pixel data on the DC bus to the command block 142. As shown, the command block 142 includes buffers which receive the data from the DC bus. The DC bus enables the command block 142 to read pixels from respective frame buffer. The DC bus also enables the draw blocks 172A and 172B to provide status back to the command block 142, such as during context switches.

The DC bus is used primarily to enable the command block 142 to read pixels back out of the respective 3DRAM memories 192 and 194. For example, when a window of pixel data is stored in the memories 192 and/or 194, and this window is partially or totally occluded by another window, the CPU 102 desires to read the occluded data from storage so that this data may be reapplied later when this windows is no longer occluded. In this instance, the CPU 102 provides a request to read the pixel data to the command block 142, and in response to a request from the command block 142, each of the draw blocks 172A and 172B read the pixel data from the memories 192 and 194 and provide this data back on the DC bus return path to the command block 142. The command block 142 then in turn provides the data back to the CPU 102 for storage.

Command Block Operation

The command block 142 controls the sequencing of transfers into the respective floating point blocks 152A-152F as described above. The command block 142 also operates to control all of the operations within the graphics accelerator system. Each of the floating point blocks 152A-152F are required to ask and receive permission from the command block 142 before a respective transfer to the drawing blocks 172A and 172B. Although not shown in the Figures, each of the output FIFO buffers 158A-158F in the respective floating point blocks 152A-152F include control lines which are coupled back to the command block 142. These control lines are used by the respective output FIFO buffers 158A-158F to ask permission of the command block 142 for a transfer to respective drawing blocks 172A and 172B. Each of the input FIFO buffers 155A-155F in the respective floating point blocks 152A-152F also use their respective control lines on the respective 12-bit channels 154A-154F to provide status information to the command block 142, including a signal which includes that the buffer is full and/or requires data, etc.

When the respective FIFO buffer 158A-158F asks for and receives permission from the command block 142, then the respective output FIFO buffer 158 then transmits primitive to each of the drawing blocks 172A and 172B. The command block 142 preferably includes counters for each of the input queues 155A-F and each of the output queues 158A-F and operates to increment these respective counters as data is received by or transferred from, respectively, the respective buffers. The command block 142 also provides control lines to each of the draw blocks 172A and 172B to indicate an order for execution for each of their received primitives.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A command for a graphics accelerator, comprising:

one or more input buffers adapted for coupling to a bus for receiving geometry input data, wherein said geometry input data includes compressed geometry input data and non-compressed geometry input data, wherein said geometry input data comprises information corresponding to one or more polygons to be rendered on an output video device;

a geometry decompression unit coupled to an output of the input buffers for receiving the compressed geometry input data, wherein the decompression unit operates to decompress the compressed geometry input data to produce decompressed geometry input data;

a multiplexer including a first input receiving an output from the input buffers, and a second input for receiving an output from the geometry decompression unit, wherein the first input of the multiplexer receives non-compressed geometry data from the one or more input buffers, wherein the second input of the multiplexer receives decompressed geometry input data from the geometry decompression unit, wherein the multiplexer includes an output which selectively provides either said non-compressed geometry data or said decompressed geometry input data;

one or more output buffers coupled to receive data from the multiplexer, wherein the output buffers provide output primitive data.

2. The command processor of claim 1, further comprising:

a format converter coupled to receive the output of the multiplexer, wherein the format converter operates to convert received data into one or more types of format; wherein the format converter is coupled to provide an output to the one or more output buffers.

3. The command processor of claim 1, wherein said one or more input buffers are adapted for receiving non-geometric data;

the command processor further comprising:

a collection buffer coupled to the output of the multiplexer for receiving said non-geometric data, wherein the collection buffer provides said non-geometric data to the output buffers.

4. The command processor of claim 3, further comprising:

a vertex accumulation buffer coupled to an output of the format converter which stores a plurality of geometry input data required for one or more vertices.

5. The command processor of claim 4, further comprising:

a plurality of vertex buffers coupled to receive an output from the vertex accumulation buffer, wherein the vertex buffers are used for constructing geometric primitives, wherein the vertex buffers provide output geometric primitive data to the output buffers.

6. A command processor for a graphics accelerator, comprising:

one or more input buffers adapted for coupling to a bus for receiving geometry input data, wherein said geometry input data includes compressed geometry input data and non-compressed geometry input data, wherein said geometry input data comprises information corresponding to one or more polygons to be rendered on an output video device;

a first data path coupled to said one or more input buffers for transferring said noncompressed geometry data;

a second data path coupled to said one or more input buffers for receiving said compressed geometry data, wherein said second data path includes a geometry decompression unit coupled to an output of the input buffers for receiving the compressed geometry input data, wherein the decompression unit operates to decompress the compressed geometry input data to produce decompressed geometry input data;

one or more output buffers coupled to receive data from said first data path and said second data path, wherein the output buffers provide output primitive data.

7. The command processor of claim 6, further comprising:

a multiplexer including a first input coupled to said first data path receiving said a non-compressed geometry input data, and a second input coupled to said second data path for receiving an output from the geometry decompression unit, wherein the first input of the multiplexer receives non-compressed geometry data from the one or more input buffers, wherein the second input of the multiplexer receives decompressed geometry input data from the geometry decompression unit, wherein the multiplexer includes an output which selectively provides either said non-compressed geometry data or said decorepressed geometry input data.

8. The command processor of claim 7, further comprising:

a format converter coupled to receive an output of the multiplexer, wherein the format converter operates to convert received data into one or more types of format; wherein the format converter is coupled to provide an output to the one or more output buffers.

9. The command processor of claim 7, wherein said one or more input buffers are adapted for receiving non-geometric data;

the command processor further comprising:

a collection buffer coupled to an output of the multiplexer for receiving said non-geometric data, wherein the collection buffer provides said non-geometric data to the output buffers.

10. The command processor of claim 9, further comprising:

a vertex accumulation buffer coupled to an output of the format converter which stores a plurality of geometry input data required for one or more vertices.

11. The command processor of claim 10, further comprising:

a plurality of vertex buffers coupled to receive an output from the vertex accumulation buffer, wherein the vertex buffers are used for constructing geometric primitives, wherein the vertex buffers provide output geometric primitive data to the output buffers.

12. A 3-D graphics accelerator for performing three-dimensional graphics acceleration functions, comprising:

a frame buffer memory;

a command block for receiving high level drawing commands for drawing three-dimensional objects;

a plurality of floating point blocks coupled to the command block for performing floating point operations, wherein said plurality of floating point blocks receive the high level commands from the command block and perform geometric floating point operations in response to said high level commands, wherein said plurality of floating point blocks each produce geometric primitive data;

one or more draw blocks coupled to the plurality of floating point blocks which receive geometric primitive data from the plurality of floating point blocks, wherein the one or more draw blocks are coupled to the frame buffer memory for rendering three dimensional object pixel data into the frame buffer memory;

a digital-to-analog converter coupled to said frame buffer memory for receiving pixel data from said frame buffer memory and providing an analog output to a video monitor;

wherein the command block comprises:

one or more input buffers adapted for coupling to a bus for receiving geometry input data, wherein said geometry input data includes compressed geometry input data and non-compressed geometry input data, wherein said geometry input data comprises information corresponding to one or more polygons to be rendered on an output video device;

a geometry decompression unit coupled to an output of the input buffers for receiving the compressed geometry input data, wherein the decompression unit operates to decompress the compressed geometry input data to produce decompressed geometry input data;

a multiplexer including a first input receiving an output from the input buffers, and a second input for receiving an output from the geometry decompression unit, wherein the first input of the multiplexer receives non-compressed geometry data from the one or more input buffers, wherein the second input of the multiplexer receives decompressed geometry input data from the geometry decompression unit, wherein the multiplexer includes an output which selectively provides either said non-compressed geometry data or said decompressed geometry input data;

one or more output buffers coupled to receive data from the multiplexer, wherein the output buffers provide primitive data.

13. The 3-D graphics accelerator of claim 12, wherein the command processor further comprises:

a format converter coupled to receive the output of the multiplexer, wherein the format converter operates to convert received data into one or more types of format; wherein the format converter is coupled to provide an output to the one or more output buffers.

14. The 3-D graphics accelerator of claim 13, wherein said one or more input buffers in said command processor are adapted for receiving non-geometric data;

the command processor further comprising:

a collection buffer coupled to the output of the multiplexer for receiving said non-geometric data, wherein the collection buffer provides said non-geometric data to the output buffers.

15. A method for processing geometry data in a graphics accelerator, comprising:

receiving geometry input data, wherein said geometry input data includes compressed geometry input data and non-compressed geometry input data, wherein said geometry input data comprises information corresponding to one or more polygons to be rendered on an output video device;

transferring said compressed geometry data on a first data path to a geometry decompression unit;

the decompression unit decompressing the compressed geometry input data to produce decompressed geometry input data;

transferring said non-compressed geometry data on a second data path, wherein said second data path does not include a geometry decompression unit; and selectively providing either said non-compressed geometry data or said decorepressed geometry data on a third data path.

16. The command processor for a graphics accelerator as recited in claim 1 wherein said geometry input data comprises vertex information corresponding to vertices of said polygon.

17. The command processor for a graphics accelerator as recited in claim 16 wherein said geometry input data further comprises color values and normal values corresponding to said vertices.

18. The command processor for a graphics accelerator as recited in claim 6 wherein said geometry input data comprises vertex information corresponding to vertices of said polygon.

19. The command processor for a graphics accelerator as recited in claim 18 wherein said geometry input data further comprises color values and normal values corresponding to said vertices.

20. The 3-D graphics accelerator for performing three-dimensional graphics acceleration functions as recited in claim 12 wherein said geometry input data comprises vertex information corresponding to vertices of said polygon.

21. The 3-D graphics accelerator for performing three-dimensional graphics acceleration functions as recited in claim 20 wherein said geometry input data further comprises color values and normal values corresponding to said vertices.

22. The method for processing geometry data in a graphics accelerator as recited in claim 15 wherein said geometry input data comprises vertex information corresponding to vertices of said polygon.

23. The method for processing geometry data in a graphics accelerator as recited in claim 22 wherein said geometry input data further comprises color values and normal values corresponding to said vertices.

\* \* \* \* \*

UNITED STATES PATENT AND TRADEMARK OFFICE
CERTIFICATE OF CORRECTION

PATENT NO. : 5,740,409

DATED : April 14, 1998

INVENTOR(S) : Michael F. Deering

It is certified that error appears in the above-indentified patent and that said Letters Patent is hereby corrected as shown below:

Claim 1, col. 20, line 38, please insert --processor-- after command.

Claim 6, col. 21, line 33, please delete "noncompressed" and insert --non-compressed--.

Claim 7, col. 21, line 57, please delete "decorepressed" and insert --decompressed--.

Claim 12, col. 22, line 67, please insert --output-- before "primitive".

Claim 15, col. 23, line 34, please delete "decorepressed" and insert --decompressed--.

Signed and Sealed this

Eighteenth Day of August, 1998

Attest:

BRUCE LEHMAN

Attesting Officer     Commissioner of Patents and Trademarks